United States Patent [19]

Hehn

[11] Patent Number: 4,716,745
[45] Date of Patent: Jan. 5, 1988

[54] VIDEO CASSETTE SECURITY DEVICE

[75] Inventor: Bruce A. Hehn, Canton, Ohio

[73] Assignee: Alpha Enterprises, Inc., Canton, Ohio

[21] Appl. No.: 898,615

[22] Filed: Aug. 21, 1986

[51] Int. Cl.⁴ .............................................. E05B 73/00
[52] U.S. Cl. ......................................... 70/58; 70/370; 70/401
[58] Field of Search ..................................... 70/57–58, 70/63, 401, 407, 370, 371; 292/307 R, 318, 321; 206/387

[56] References Cited

U.S. PATENT DOCUMENTS

| | | | |
|---|---|---|---|
| 1,094,279 | 4/1914 | Wagner | 70/10 |
| 3,125,873 | 9/1962 | Robinson | 70/63 |
| 3,659,442 | 5/1972 | Cellini | 70/63 |
| 3,933,240 | 1/1976 | Humble | 55/04 |
| 4,628,713 | 12/1986 | Cecchi | 70/58 |

FOREIGN PATENT DOCUMENTS 107550  10/1927  Austria ..................................... 70/63

OTHER PUBLICATIONS

Photocopy of p. 36 entitled Product Corner of the "Music/Video Retailer" magazine, issued Apr. 1986.

Primary Examiner—Robert L. Wolfe
Attorney, Agent, or Firm—Michael Sand Co.

[57] ABSTRACT

A security device for mounting in the alignment or positioning channel of video cassette which prevents utilization of the cassette in a VCR. The security device comprises a locking member having tabs which extend into openings of the alignment channel to retain the member therein after insertion into the channel. The locking member is removed by a key which is inserted into the bore of the locking member and has barbs at its lower end which engage the tabs of the locking member and retract them from within the openings to permit the locking member to be withdrawn from the cassette channel. The locking member also may secure the cassette within a container by passing through a hole in the wall of the container and then into the cassette channel aligned therewith.

19 Claims, 25 Drawing Figures

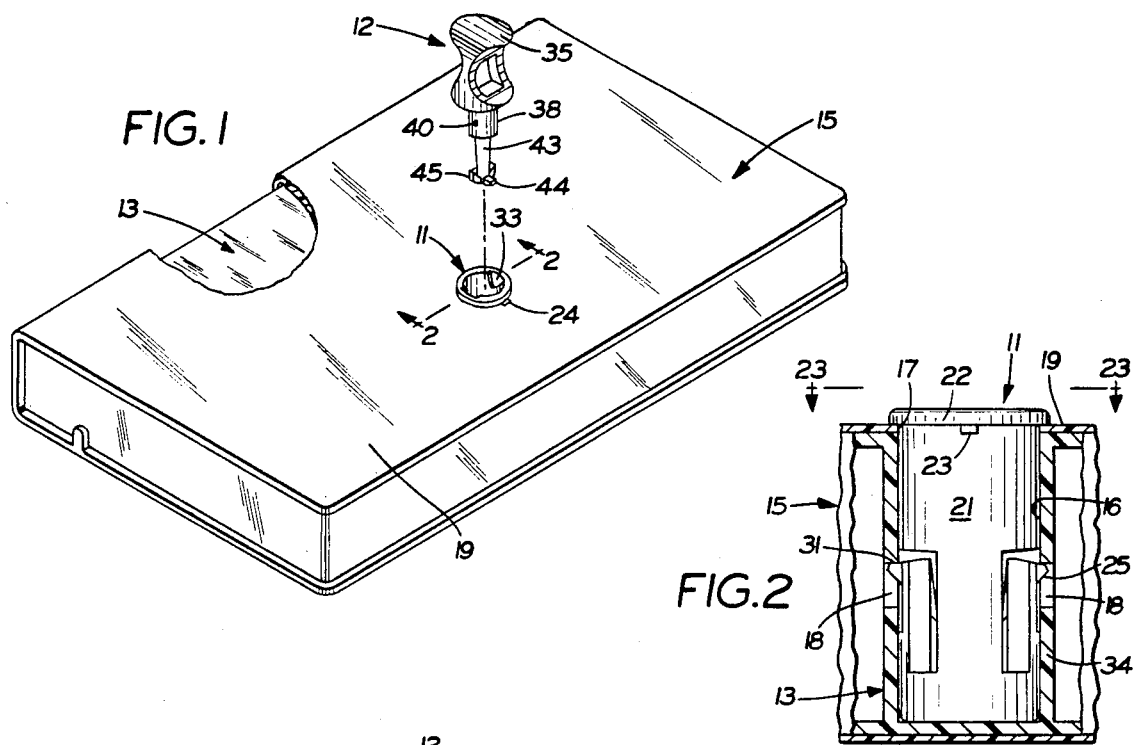
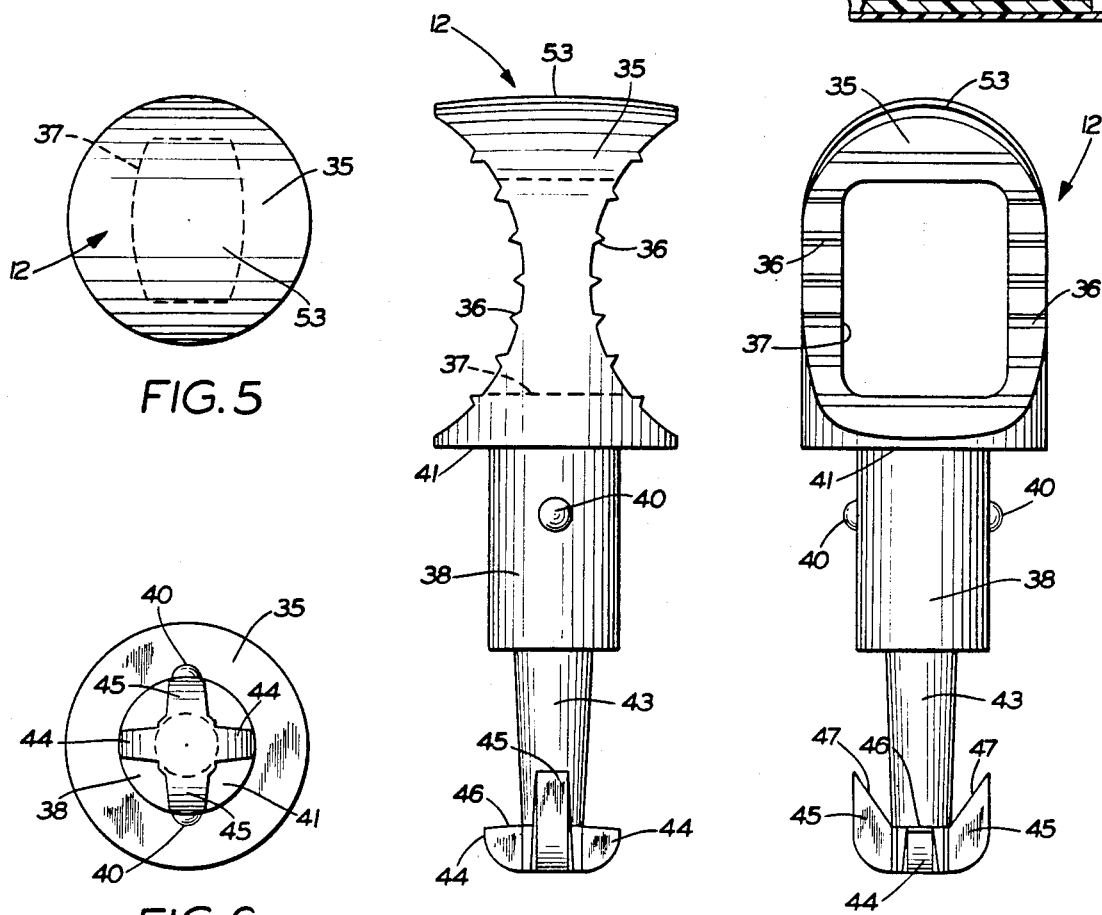

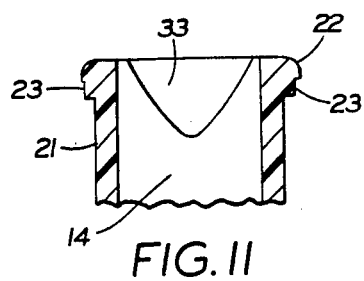
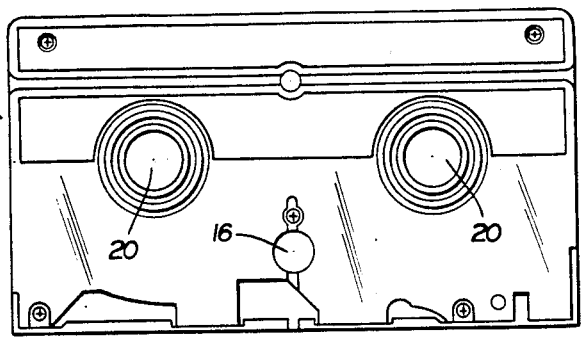
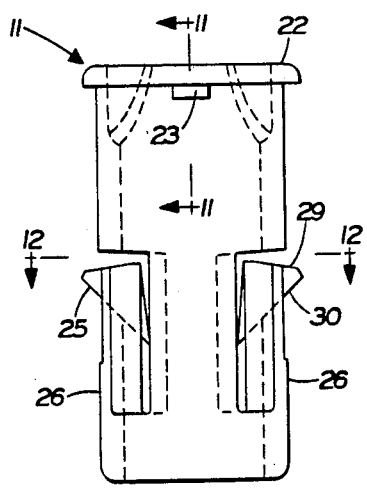
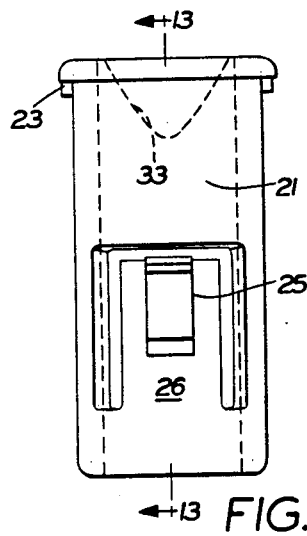
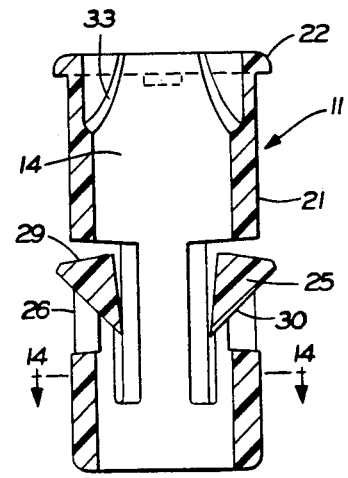
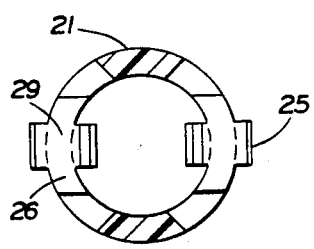
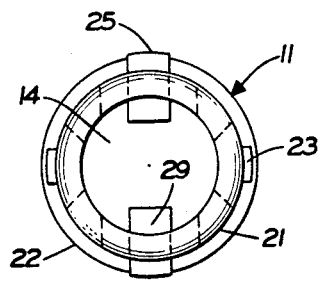
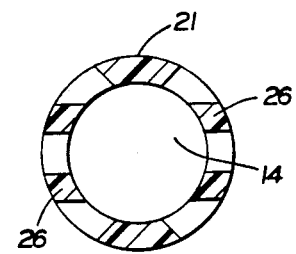
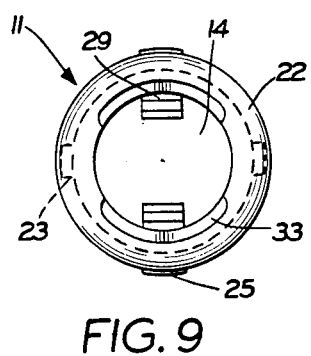
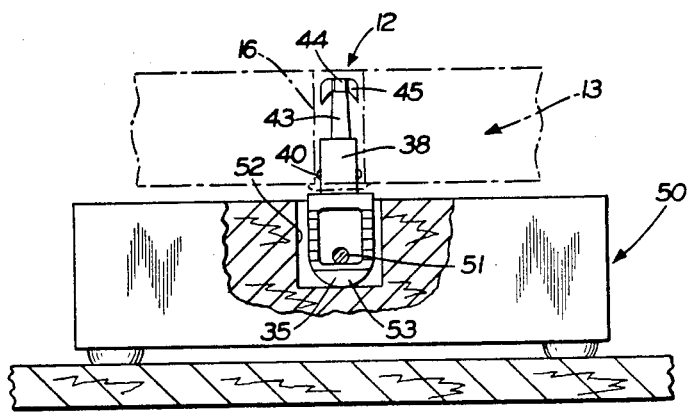

VIDEO CASSETTE SECURITY DEVICE

TECHNICAL FIELD

The present invention relates to a security device for preventing or retarding the unauthorized use of a video cassette in a VCR or to prevent its removal from its storage container. More specifically, the present invention relates to a security device in the form of a locking member which is engaged in the alignment channel of the video cassette and to a key for removing the locking member from the cassette.

BACKGROUND ART

Security for theft prevention is a constant problem for merchants dealing in video cassettes, whether the cassettes are for retail sales or for rental purposes. Heretofore, metal strips or tabs detectable by electronic surveillant devices located at the store exists have been utilized in association with video cassettes to detect unauthorized removal of the cassette from the store. However, such electronic surveillant devices can often be defeated and the equipment is expensive to purchase and install.

One previous type of security device for a video cassette consists of a locking device produced by A.M. Products of Denmark which fits into one of the cassette sprockets to prevent playing thereof. Another type of security device is shown in U.S. Pat. No. 3,933,240 and relates to a transparent security container for a tape cassette. An anti-theft device such as a microwave reradiator which triggers an alarm if it enters a microwave field, is contained thereon along with a pair of spaced key slots associated with clips for retaining the cassette in the container. A release device at a check out station permits easy release of the cassette from within the secured container.

Another theft prevention problem is that individuals will remove the cassette from within a storage container in order to reduce the size of the cassette facilitating its unauthorized removal from the store. Although it is difficult to provide a fail safe security system for video cassettes, it is desirable to provide some type of inexpensive device which will retard if not prevent repeated thefts of video tapes.

There is no known device of which I am aware which can be inserted into a preformed opening in a video cassete such as the alignment pin opening, which device cannot be removed without the use of a key which is maintained in the possession of authorized personnel.

SUMMARY OF THE INVENTION

Objectives of the invention include providing an improved security device for use with video cassettes which is formed of a rigid plastic material and which includes a locking member insertable into a cylindrical-shaped channel orr opening present in many types of video cassettes and in particular those of the VHS format, which device will prevent the cassette from being played in a video cassette recorder (VCR) until the locking member has been removed from the channel. A further objective is to provide such an improved security device in which a key is provided to authorized personnel to easily and conveniently remove the locking member from within the cassette after purchase of the cassette by an individual enabling the locking member to be reinserted into other cassettes and reused numerous times eliminating the purchase of a large number of such locking members.

It is a still further objective of the invention is to provide such an improved security device in which the locking member has a pair of tabs which engage recesses or openings present in existing VHS cassettes, which tabs are retracted by barbs formed on the end of the key which is insertable into the bore of the locking member, and in which the barbs are properly positioned and aligned with the tabs by V-shaped alignment notches formed on the upper portion of the locking member.

A still further objective of the invention is to provide such a locking device which can be mounted directly in the alignment channel of a cassette and the cassette subsequently placed in a storage container, or which can be inserted through a hole formed in one wall of the storage container which aligns with the cassette channel for locking the cassette within the storage container until released therefrom by the unlocking key component of the security device.

A further objective is to provide such a security device in which the key may be mounted in a generally upright position on a tabletop unit enabling the sales personnel to merely place the secured cassette downwardly upon the key which will automatically unlock and retract the locking member from within the cassette eliminating manual manipulation of the key, and in which the tabletop unit will retain the key in a secured position at a checkpoint counter preventing subsequent loss or theft of the key further increasing the security of the system.

A still further objective of the invention is to provide such a security device in which both the locking member and key are formed relatively inexpensively of a rigid plastic material preferrably stronger than the softer plastic from which the cassette storage containers are formed, whereby forceful removal of a locked cassette from within a storage container will cause the locking member to pull through the container wall causing a loud popping sound to further retard the theft of cassettes.

These objectives and advantages of the invention are obtained by the improved security device which is adapted to be mounted in the alignment channel of a video cassette to prevent said cassette from being operative in a VCR, in which the general nature of the invention may be stated as including a security device for a cassette of the type having a channel extending at least partially therethrough and having an opening in a sidewall of said channel, said device further including a locking member, said locking member capable of engaging said alignment channel, said locking member having at least one tab formed thereon, said tab being capable of extending into said channel sidewall opening and securing said locking member in said cassette channel.

BRIEF DESCRIPTION OF THE DRAWINGS

A preferred embodiment of the invention, illustrative of the best mode in which applicant has contemplated applying the principles of his invention, is set forth in the following descriptions and is shown in the drawings and is distinctly and particularly pointed out and set forth in the appended claims.

FIG. 1 is a perspective view with portions broken away showing the locking member of the present invention residing in a cassette placed in a storage container in combination with a key utilized in association therewith for removing the locking member;

FIG. 2 is an enlarged fragmentary cross-sectional view taken on line 2—2 of FIG. 1, showing the locking member installed in the alignment channel of the cassette;

FIG. 3 is an enlarged side-elevational view of the key;

FIG. 4 is a front-elevation view of the key as shown in FIG. 3;

FIG. 5 is a top-plan view of the key as shown in FIG. 3;

FIG. 6 is a bottom-plan view of the key as shown in FIG. 3;

FIG. 7 is an enlarged side-elevational view of the locking member removed from the cassette of FIG. 1;

FIG. 8 is a front-elevational view of the locking member of FIG. 7;

FIG. 9 is a top-plan view of the locking member of FIG. 8;

FIG. 10 is a bottom-plan view of the locking member of FIG. 8;

FIG. 11 is a cross-sectional fragmentary view of the upper portion of the locking member taken on line 11—11, FIG. 7;

FIG. 12 is a cross-sectional view taken on line 12—12, FIG. 7;

FIG. 13 is a vertical cross-sectional view taken on line 13—13, FIG. 8;

FIG. 14 is a horizontal cross-sectional view taken on line 14—14, FIG. 13;

FIG. 24 is a bottom-plan view of a video cassette of the type having an alignment channel in which the improved security device will be installed; and FIG. 25 is a diagrammatic side-elevational view with portions broken away and in section showing a countertop-mounted unit containing the removal key, with the key being shown inserted into the locking member of a video cassette shown in dot-dash lines.

Similar numerals refer to similar parts throughout the drawing.

BEST MODE FOR CARRYING OUT THE INVENTION

Figure 15:
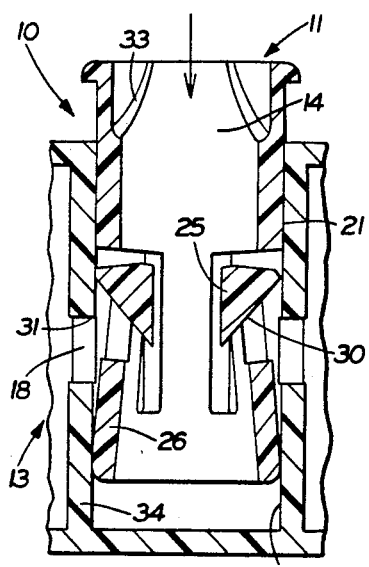
FIG. 15 is a cross-sectional fragmentary view showing the locking member partially inserted in the alignment channel of a video cassette.

The security device of the present invention is generally indicated by the numeral 10. The security device comprises two main components, a locking member and a key indicated generally at 11 and 12, respectively. The security device of the present invention is utilized in association with a conventional cassette 13, preferably a VHS video cassette of the type shown in FIG. 24. The security device can be used either in combination with a storage container 15 as shown in FIG. 1, or in the cassette individually. The security device is intended to act as a deterrent to theft and is used is combination with container 15 when the cassette is being sold as a used cassette or as a rented cassette since a hole 17 will be formed in a cover wall 19 of container 15. Container 15 is of a usual construction and may be of the type shown in U.S. Pat. No. 4,184,594. Likewise, video cassette 13 is of a usual construction having a pair of spaced reels 20 and an alignment channel or hole 16 intermediate of and below reels 20.

Nearly all VHS video cassettes have such a positioning or alignment channel 16 formed in the cassette as shown in FIG. 24. Furthermore, side openings 18 or slots are formed in the cassette and communicate with channel 16 as shown in FIG. 2. Channel 16 is generally cylindrical shaped and cooperates with a sensing pin (not shown) of a usual video cassette recorder (VCR) for operation of the machine, and in particular a machine for playing the VHS format. Upon the cassette entering the VCR, the sensing pin projects into channel 16 and assists in controlling the operation of the VCR. As apparent from the various drawings, for example, FIGS. 15 through 20, the alignment channel side openings 18 are generally located in the center portion of the channel, although they can also be located in the upper sidewall portion of the channel. Locking member 11 is insertable into alignment channel 16 and prevents the cassette from being placed in the VCR due to the locking member physically interfering with the VCR sensing pin entering channel 16, or will prevent the presence of the pin within the channel from being sensed by sensors in the VCR. Thus, locking member 20 prevents unauthorized use of the cassette in a VCR until it is removed from channel 16.

Considering the locking member, it is shown in numerous drawings such as in FIG. 2, and in FIGS. 7 through 20. Locking member 11 has a cylindrical sidewall 21 and an annular top flange 22 which is integrally connected to the top portion of the sidewall and extends horizontally radially outward therefrom. Flange 22 is so designed so that when locking member 11 is inserted into cassette channel 16 through hole 17 of storage container wall 19 as shown in FIG. 1, and a sufficient force is applied to the flange upon an unauthorized forceful attempt to remove a secured cassette from container 15, the flange will pass through hole 17 and separate from the sidewall. This result can be accomplished since container 15 including wall 19 is formed of a thinner and softer plastic material than that of locking member 11. Forceful pulling of flange 22 through hole 17 to remove the cassette from container 15 will cause a loud popping noise. This popping noise also acts as a deterrent to unauthorized removal of the cassette from its storage container. However, locking member 11 will remain in the cassette and still prevent the cassette from being inserted into a VCR after its unauthorized removal from the store.

Figure 23:
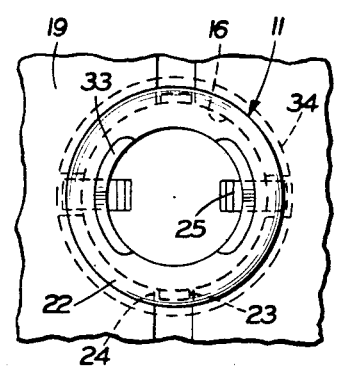
FIG. 23 is a fragmentary plan view looking in the direction of arrows 23—23, FIG. 2.

Locking member 11 includes a pair of alignment projections 23 which are formed on sidewall 21 beneath flange 22 and extend downwardly therefrom to ensure that locking member 11 is correctly inserted into the storage container hole 17 and correspondingly correctly into cassette 13. Projections 23 extend into cutouts 24 (FIG. 23) formed diametrically opposite of each other in wall 19 adjacent hole 17.

An important aspect of the locking member is that it contains at least one locking tab and preferably two such tabs 25, which are integrally connected to sidewall 21 by a plastic or "live hinge" 26 in order to bias the tabs in a radially outward direction from sidwall 21. The tabs, as shown in FIGS. 7 and 13, have a generally flat or horizontal upper surface 29 and a downwardly inwardly tapered inclined surface 30. Upper surface 29 is capable of engaging upper edge 31 which defines a portion of side openings 18 of the alignment channel. Tabs 25 are of sufficient thickness or strength such that they provide high shear resistance and hence deter the locking member from being forceably withdrawn from within channel 16 by a thief. Numerous types of plastics may be utilized such as polycarbonate, nylon, and the like. A preferred plastic is Delrin, a trademark of the DuPont Company for a type of acetal resin.

As seen in FIG. 11, locking member sidewall 21 has a notch 33 located at the upper portion thereof. Generally, two such notches are located diametrically opposed to each other. The notches extend downwardly into the sidewall and are generally of a "V" shape.

Figure 16:
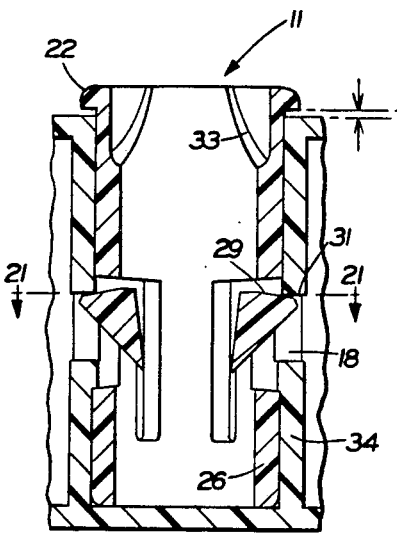
FIG. 16 is a cross-sectional view similar to FIG. 15 showing the locking member fully inserted into the alignment channel.
Figure 21:
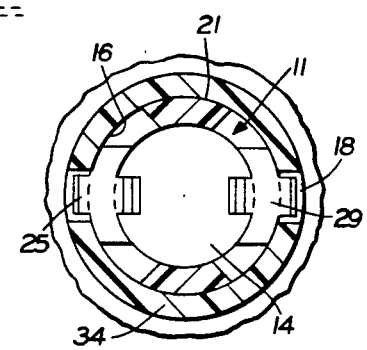
FIG. 21 is a fragmentary cross-sectional view taken on line 21—21, FIG. 16.
Figure 17:
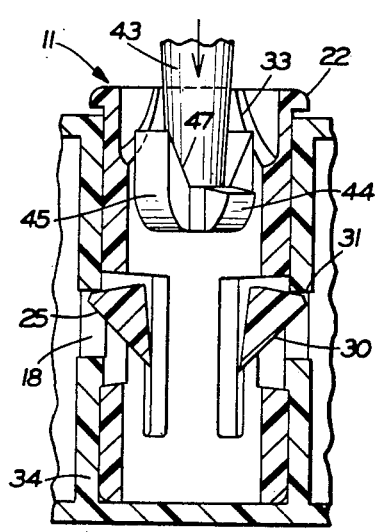
FIG. 17 is a cross-sectional view similar to FIG. 16 showing the key partially inserted in the locking member.

The insertion of locking member 11 into channel 16 of a cassette 13 is best illustrated in FIGS. 15 and 16. During insertion, tabs 25 are pushed inwardly on hinges 26 so that they engage the inside surface of cylindrical wall 34 which forms the alignment channel and slide thereon. During insertion, guide projections 23 are positioned to be received within cutouts 24 located on container wall 19 so that tabs 25 are in alignment with side openings 18 of channel 16. Upon pushing locking member 11 downwardly into the alignment channel, tabs 25 will spring outwardly into side openings 18, as shown in FIG. 16 securing locking member 11 within the channel.

Upon any upward movement of the locking member, upper surfaces 29 of tabs 25 will engage upper edges 31 of the alignment channel openings 18 and bear thereagainst. Upon further upward urging of the locking member, tabs 25 will jam against edges 31 and prevent the locking member from being withdrawn from channel 16. Although the various drawings show that the locking member extends down to the bottom of the cassette, it need only extend a sufficient distance so that the tabs can extend into the side openings of alignment channel wall 34.

Key 12 is utilized for releasing locking member 11 from the cassette. The key has a finger engaging handle 35 with optional serrated or gripping projections 36 thereon. The key handle can optionally have an opening 37 formed therein. Key 12 has a main cylindrical shaft 38, the diameter of which is generally complementary to the interior of cylindrical sidewall 21 of the locking member. Alternatively, the diameter of main shaft 38 can be slightly smaller than the diameter of the locking member sidewall.

Figure 19:
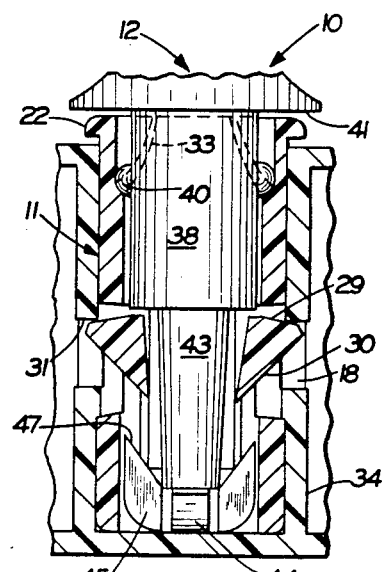
FIG. 19 is a cross-sectional view similar to FIGS. 17 and 18 showing the key fully inserted in the locking member.

A pair of projections 40 preferably are provided on diametrically opposite sides of the main shaft and extend radially outwardly therefrom and are located beneath handle 36 generally the same distance as are the bottoms of V-shaped notches 33 from top flange 22 of locking member 11. As will hereinafter be more fully explained, projections 40 slide along the sides of notches 33 until they engage the bottom portion of the notches at which position a bottom flat surface 41 of the handle is located juxtaposition to top flange 22, as shown in FIG. 19.

Key 12 further includes a lower shaft portion 43 having a smaller diameter than main shaft 38 and extends therefrom and terminates in a pair of bottom guides 44 and a pair of barbs 45. As seen in FIGS. 3, 4, and 6, guides 44 generally extend laterally outward of the lower shaft and have a flat or horizontal upper surface 46. The spacing of the outer ends or diameter of guides 44 is approximately equal to the inside diameter or bore 14 of cylindrical sidewall 21 of locking member 11. The guides maintain inserted key 12 in an vertical upright aligned position within sidewall 21.

Figure 20:
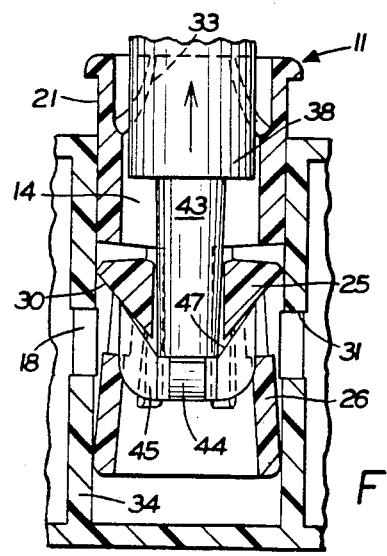
FIG. 20 is a cross-sectional view similar to FIGS. 17-19 showing the key partially removing the locking member from the alignment channel.
Figure 22:
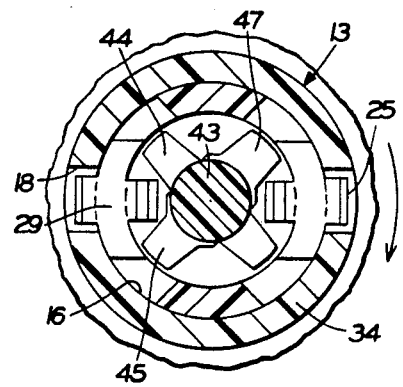
FIG. 22 is a fragmentary cross-sectional view taken on line 22—22, FIG. 18.

Barbs 45 also extend generally laterally outward of lower shaft portion 43 and have inclined upper surfaces 47 which extend outwardly and upwardly in a manner as shown in FIG. 4. The angle of upper barb surfaces 47 generally conforms to the angle formed by the lower portion of tabs 25 with hinges 26, that is, inclined surfaces 30. Desirably, barb surfaces 47 form an angle which is more acute than inclined surfaces 30 of tabs 25 so that the barbs can draw the tabs readily inward when contact is made therewith as shown in FIGS. 18 and 20.

Figure 18:
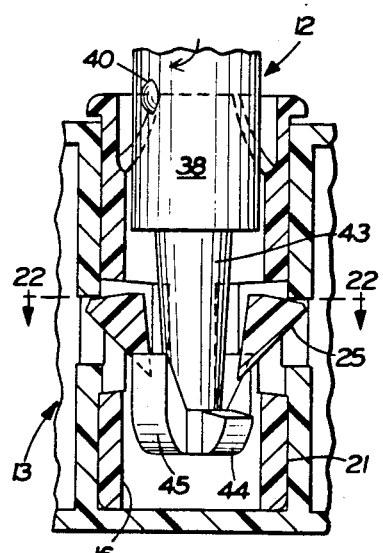
FIG. 18 is a cross-sectional view similar to FIG. 17 showing the key almost fully inserted in the locking member.

Operation of the key to remove locking member 11 from the cassette is shown particularly in FIGS. 17-20. The lower shaft of the key is inserted into the upper portion of sidewall bore 14 with key projections 40 being positioned within V-shaped notches 33 (FIG. 18). As the key is pushed further downwardly into bore 14 of the locking member it will rotate automatically approximately 45 degrees as projections 40 rides along and down the sides of notches 33 until reaching the bottom of the notches.

It is important to the present invention that notches 33 cause the key to rotate an appropriate distance such as 45 degrees (FIGS. 17-19), so that barbs 45 bypass locking member tabs 25. Otherwise, key barbs 45 would contact tabs 25 and jam the same against a sidewall opening edges 31 preventing the key from being fully inserted into the locking member. That is, tabs 25 cannot be expanded outwardly any further and, hence, would prevent the insertion of the key. Notches 33 are so positioned on the upper portion of the locking member so that when key projections 40 contact the lowermost portion of the notches, key barbs 45 are positioned directly under locking tabs 25, as shown in FIG. 19.

Upon moving the key directly upward, upper barb surfaces 47 contact inclined tab surfaces 30. As the key is continually pulled upward, barb surfaces 49 act as an inclined plane and cause tab surfaces 30 to slide thereover in a radial inward direction so that locking member tabs 25 can be released from within cassette openings 18. In other words, barb surfaces 47 cause the tabe to be retracted from within channel sidewall openings 18. The locking member can then be slid up and out of alignment channel 16 in a manner as shown in FIG. 20.

In order to facilitate installation of the key into the cassette in a retail establishment to remove locking member 11 therefrom, a counter or table top mounted unit indicated generally at 50, can be utilized as shown in FIG. 25. Unit 50 has a recess 52 in which handle 35 of key 12 is loosely seated and retained by a pin 51. Recess 52 is sufficiently large enough to hold the key as well as to permit limited rotating movement of the key on pin 51 to achieve the 45 degrees rotational movement of the key as the key is inserted into a locking movement 11 and key projections 40 move along V-shaped notches 33 as described above. Rounded top end 53 of key 12 engages the bottom of recess 52 and enables the key to rotate easily through the desired 45 degrees as the key enters cylindrical bore 14 of locking member 11.

Once the cassete has been placed vertically downward onto unit 50 and key 12 automatically inserted into locking element 11, the cassette is pulled directly upward so that barbs 45 engage tabs 25 of the locking member thereby drawing the same inward and permitting the locking member to be readily removed vertically from the cassette as the cassette is lifted upwardly off unit 50.

The security device of the subject invention will not forceably prevent the removal of a video cassette from a store but will retard the subsequent theft of such cassettes since only a theif has taken a cassette and finds that it is inoperable in a playback machine, he will not be as apt to take additional cassettes from the same store knowning that if the theft is successful, the cassette will not be playable. Also, the security device can secure the cassette within a container as shown in FIG. 1, in contrast to just placing the locking member in the cassette without first passing through the container wall. Either of these uses will achieve the same basic results, the retarding of theft of the cassette.

The formation of the key and locking member 11 of a rigid plastic will prevent it from being forceably torn from within the cassette channel 16 even though annular flange 22 may be ripped through container hole 17. Furthermore, even should a thief cut off flange 22 from the top of locking member 11 when secured within channel 16, the cassette still is inoperable since cylindrical sidewall 21 of locking member remains in the channel.

Accordingly, the video cassette security device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the video cassette security device is constructed and used, the characteristics of the construction, and the advantageous, new and useful results obtained; the new and useful structures, devices, elements, arrangements, parts, and combinations, are set forth in the appended claims.

What is claimed is:

1. A security device for a cassette of the type having a channel extending at least partially therethrough and having an opening in a sidewall of said channel, said device including:

a locking member, said locking member capable of engaging said alignment channel, said locking member having at least one tab formed thereon biased in a radially outward direction and being capable of extending into said channel sidewall opening and securing said locking member in said cassette channel, said locking member further having an outwardly extending annular flange located at an upper portion of said member, and a V-shaped guide notch formed in said upper portion and extending downwardly from said flange.

2. A security device for a cassette according to claim 1, wherein said tab has a lower inclined surface.

3. A security device for a cassette according to claim 1, wherein the upper portion of said locking member includes a cylindrical sidewall forming an axially extending bore, and wherein the horizontal distance between the top of said guide notch and the bottom of said notch is approximately 45 degrees of said cylindrical sidewall.

4. A security device for a cassette according to claim 1, wherein said locking member is capable of engaging said cassette enclosed in a storage container.

5. A security device for a cassette according to claim 1, wherein said locking device is capable of engaging a cassette enclosed in a storage container, said locking device having an alignment projection thereon, said alignment projection capable of engaging said storage container to position said device in an opening formed in a wall of said storage container.

6. A security device for a cassette according to claim 1, including a key, said key slidably engaging said locking member, said key having a main shaft and a lower shaft with said lower shaft having a smaller diameter than said main shaft.

7. A security device for a cassette according to claim 6, wherein said lower shaft has at least one barb thereon, said barb having an inclined upper surface.

8. A security device for a cassette of the type having a channel extending at least partially therethrough and having an opening in a sidewall of said channel, said device including:

a locking member, said locking member capable of engaging said alignment channel, said locking member having at least one tab formed thereon biased in a radially outward direction; said tab being capable of extending into said channel sidewall opening and securing said locking member in said cassette channel; a key slidably engaging said locking member, said key having a main shaft and a lower shaft with said lower shaft having a smaller diameter than said main shaft and having at least one barb thereon with an inclined surface; and said key being formed with at least one guide projection, said guide projection slidably engaged in a guide notch formed in an upper wall portion of the locking member whereby said one barb is rotated upon insertion of said key into said locking member.

9. A security device for a cassette according to claim 8, wherein the barb upper surface engages an inclined surface formed on the tab of the locking member and upon removal of said key causes said tab to be retracted from within the channel sidewall opening.

10. A security device adapted to be mounted in an alignment channel of a video cassette to prevent said cassette from being operative in a VCR, said device including:
(a) a generally cylindrical-shaped locking member insertable into the alignment channel, said locking member having an axially extending bore and a pair of outwardly biased tabs engageable in openings formed in the cassette adjacent to and communicating with the alignment channel; and
(b) a key insertable into the bore of the locking member, said key having a shaft formed with a cylindrical seection complementary to the bore of the locking member and a pair of barbs formed thereon engageable with the tabs of the locking member to retract said tabs from within in the channel openings and to extract the locking member from within said channel.

11. The security device defined in claim 10 in which the cassette is adapted to be located in a storage container having a wall, said wall having a hole formed therein aligned with the alignment channel of the cassette; in which the locking member includes a cylindrical sidewall and an annular end flange; and in which the locking member extends through the container wall hole and into the channel with said locking member flange engaging the container wall to lock the cassette to said wall within the container.

12. The security device defined in claim 10 in which the key is formed with radially outwardly extending projection means; in which the locking member is formed with inner notch means adjacent the bore; and in which said projection means engages the notch means as the key is inserted axially into the bore of the locking member causing rotation of said key.

13. The security device defined in claim 10 in which the locking member is formed of a rigid plastic; and in which the tabs are molded integrally with a cylindrical sidewall of said locking member and is connected thereto by a line hinge which biases the tabs in an outward direction.

14. The security device defined in claim 10 in which the key is loosely mounted in a generally inverted vertical position on a base for engagement with the locking member in a cassette upon placement of said cassette in a generally vertical downward direction on the key.

15. A security device adapted to be mounted in an alignment channel of a video cassette to prevent said cassette from being operative in a VCR, said device including:

(a) a generally cylindrical-shaped locking member insertable into the alignment channel, said locking member having an axially extending bore, an inner notch means adjacent the bore, and a pair of outwardly biased tabs engageable in openings formed in the cassette adjacent to and communicating with the alignment channel; and
(b) a key insertable into the bore of the locking member, said key having a pair of barbs formed thereon engageable with the tabs of the locking member to retract said tabs from within in the channel openings and to extract the locking member from within said channel; said key being formed with radially outwardly extending projection means engageable with the inner notch means of the locking member as the key is inserted axially into the bore of said locking member causing rotation of said key.

16. A device for securing a cassette in a storage container, said cassette being of the type having a channel extending at least partially therethrough and having an opening in a sidewall of said channel, said device including:
(a) a locking member extending through an opening in a wall of the storage container aligned with the cassette channel, said locking member having at least one tab formed thereon extending into said channel sidewall opening and securing said locking member in said cassette channel, and an outwardly extending flange located on a portion of said locking member and engageable with said container wall to secure said locking member to the container when the tab extends into the channel sidewall opening.

17. A device according to claim 16, wherein a key slidably engages the locking member and has at least one barb engageable with the tab of the locking member to retract said tab from within the channel sidewall opening to remove the locking member from the cassette channel.

18. A device according to claim 16, wherein the locking member has an alignment projection thereon engageable in a notch formed on the container wall to position said locking member in the container wall opening.

19. A device according to claim 16, wherein the flange is an annular outwardly extending flange and is located on an upper portion of the locking member.

* * * * *